United States Patent [19]
Ratliff

[11] 4,056,089
[45] Nov. 1, 1977

[54] THROTTLE VALVE LOCK FOR AUTOMOBILE

[76] Inventor: David P. Ratliff, 4578 Post, Troy, Mich. 48084

[21] Appl. No.: 712,924

[22] Filed: Aug. 9, 1976

[51] Int. Cl.² ............................................. F02B 77/00
[52] U.S. Cl. .................................................. 123/198 B
[58] Field of Search ................. 123/198 B; 137/384.2, 137/384.6, 384.4, 384.8, 385; 180/114

[56] References Cited

U.S. PATENT DOCUMENTS

| | | | |
|---|---|---|---|
| 1,150,162 | 8/1915 | Arnold | 137/384.6 |
| 1,157,929 | 10/1915 | Dugan et al. | 123/198 B |
| 1,181,571 | 5/1916 | Conley | 123/198 B |
| 1,182,586 | 5/1916 | Rogers | 123/198 B |
| 1,221,044 | 4/1917 | Galz | 123/198 B |
| 1,282,067 | 10/1918 | Gohring | 137/385 |
| 1,347,609 | 8/1915 | Bassett | 137/384.8 |
| 1,519,961 | 12/1924 | Ham | 123/198 B |
| 1,582,528 | 4/1926 | Michael | 123/198 B |

*Primary Examiner*—Charles J. Myhre
*Assistant Examiner*—Ira S. Lazarus
*Attorney, Agent, or Firm*—Allan J. Murray

[57] ABSTRACT

A locking member to block motion of the throttle valve lever, to prevent admission of gasoline to an internal combustion engine; means mounting the locking member upon the carburetor for travel between a throttle valve locking position and a release position; drive means to selectively urge the lock member in travel between the two positions; a housing mounted within the passenger compartment of the vehicle, and containing a locking assembly accessible to a driver to control the lock member; the locking assembly including a slide member slidable in reversible travel to actuate the drive member to urge the lock member in reciprocable travel between the throttle valve locking and release position.

8 Claims, 14 Drawing Figures

THROTTLE VALVE LOCK FOR AUTOMOBILE

FIELD OF THE INVENTION

Invention lies in the general area of devices to resist theft of automobiles. More specifically, the invention substantially immobilizes the throttle valve so that an engine cannot be started, by selectively obstructing or clearing the path of travel of a throttle valve lever.

SUMMARY OF INVENTION

Invention consists in providing a locking member mountable on the carburetor for travel between a locking position and release position with respect to the throttle valve lever, and in providing means disposed within the passenger compartment to exercise control over the locking member.

An object of the invention is to provide a bracket, which may be secured to a carburetor, or adjacent to a carburetor, and serve to mount a locking member for travel between the aforesaid throttle valve locking position and release position.

A further object is to provide a drive means by which the locking member is selectively disposed in one of the two positions.

A further object is to provide a locking assembly within the passenger compartment of a vehicle, to afford placing the locking member in a locking or release position from within the vehicle.

Still a further object is to provide a housing for the locking assembly, with an actuator disposed within said housing to actuate said drive means, A further object is to provide a handle to extend from the actuator through a slot in the housing whereby the handle is accessible to the driver of a vehicle.

A further object is to provide slide means to afford sliding travel of said actuator to a throttle valve lock position and throttle valve release position within the housing, said positions corresponding to the positions of the locking member.

Still a further object is to provide, within the housing, restraint means releasably engageable with the actuator in the locking position to resist travel of the actuator, and consequently the lock member, to the release position.

Still a further object is to provide a trigger slidably surmounting said actuator, and slidable thereon to encounter said restraint means and disengage said restraint means from the actuator.

A further object is to provide spring means urging said trigger in restraint releasing travel, and to still further provide latch means to releasably engage said trigger and resist said spring means until said latch means are released by a vehicle operator.

Still a further object is to provide a key-operated mchanism to disengage the latch means from the trigger to afford response of the trigger to said spring.

These and various other objects are attained by the construction hereinafter described, and illustrated in the accompanying drawings, wherein.

DESCRIPTION

Figure 1:
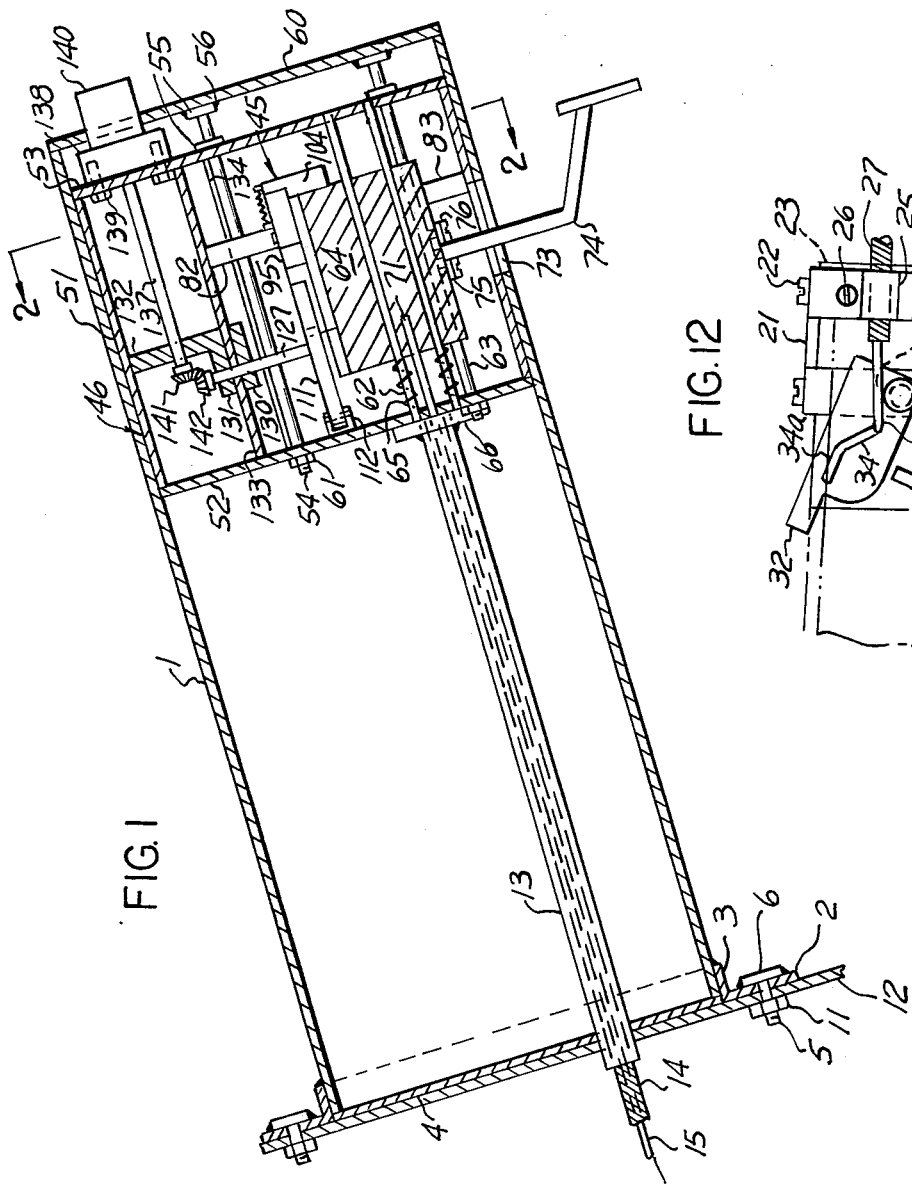
FIG. 1 is a vertical, longitudinal, sectional view taken on line 1—1 of FIG. 2 through the locking assembly rearwardly of a firewall, and showing also the throttle lever of a carburetor (the carburetor is in phantom line), the lock member, and the mounting bracket for the lock member.

In these views the reference character 1 designates a tubular sleeve. An annular flange 2 is formed with annular collar 3 to receive the forward end portion of the said sleeve 1, and the sleeve and collar may be brazed or welded, or otherwise secured together. The annular collar receives a circular disc, or forward end plate 4 to enclose the forward end of the tubular sleeve.

Threaded studs 5 are formed with disc-like heads 6, which may be welded or secured rigidly to the flange. Nuts 11 are received by the threaded studs 5 which protrude through holes in a fire wall 12. The studs 5 and nuts 11 serve to mount the hereinafter described assembly on the fire wall of a motor vehicle.

A rigid tube 13 has an end portion protruding through the forward end plate 4 and the fire wall 12, and receives a flexible conduit 14, which conduit slidably carries a wire 15. The purpose of the tube is to hold a desired portion of the flexible conduit and wire against flexure.

The left hand portion of FIG. 1 discloses a bracket 21, secured by screws 22 to the upper surface of a carburetor 23. The reference character 24 designates the rearward leg of the bracket 21, which leg mounts a clamp member 25 by means of a screw 26 which is threadedly received in said leg 24. The clamp secures an end portion 27 of the flexible conduit 14 against movement. The bracket 21 has still a further leg 31, which pivotally mounts a lock member 32. Shoulder screw 33 is threadly received in the leg 31, and pivotally supports said lock member in position.

Figure 12:
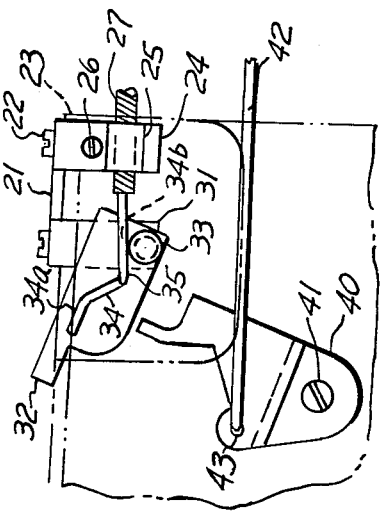
FIG. 12 is a side elevational view of the carburetor, throttle lever, and lock member showing the lock member in its throttle lever release position.
Figure 11:
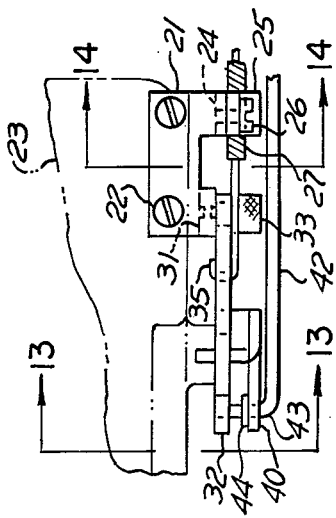
FIG. 11 is a horizontal, partial view of the carburetor and the lock member, taken on line 11—11 of FIG. 1.

A slot 34 is formed in the lock member, and has angled portions 34a and 34b. An end portion 35 of the flexible wire 15 extends through such slot and is return bent to form a U-shape, as best shown in FIG. 11, so that said end portion 15 will slide in the aforesaid slot 34, 34a, 34b, and due to the predetermined angle of the slot 34 will dispose the locking member in the throttle lever locking position (FIG. 1) or the throttle lever release position (FIG. 12).

As aforesaid the locking member can obstruct movement of the throttle valve lever, which effectively prevents a potential thief from starting the engine. The throttle valve lever is pivotly mounted upon the carburetor by a screw 41 and is provided with an actuating rod 42, which will extend to a foot pedal (not shown) in the passenger compartment of a vehicle. The forward end portion 43 of the actuating rod 42 is bent at right angles to said rod and passes through the throttle valve lever, and is terminally adapted to be retained in such position by a snap ring 44.

Disposed within the rearward end portion of the tubular sleeve 1 is a lock assembly 45. Said lock assembly includes an annular wall 51, a front wall 52, and a rear wall 53. Elongated studs 54 secure the two end walls 52 and 53 in position. The studs are provided at their rearward end portion with rigidly carried discs 55, disposed exteriorly of the rear wall 53. It may be noted that the studs 54 rearwardly terminate in circular heads 56, which spaces the assembly from the rear wall 60 of the tubular sleeve 1. Said rear wall may be secured to the sleeve 1 as by welding to resist dislodgement. The forward end portions of the studs 54 pass through the front wall 52 of the lock assembly and are threaded to receive nuts 61 which retain the two end walls in their position relative to the annular wall 51.

A pair of slide rods, including an upper rod 62 and a lower rod 63 have their end portions firmly secured by the said end walls 52 and 53, and slidably mount an actuator 64. The forward end portion of each rod is encircled by a coil spring 65; the function of the spring is to urge said actuator in rearward travel toward the rear wall 53 of the lock assembly.

The rearward end portion of the rigid tube 13 is received and retained in a block 66, which may be secured to the front wall 52 of the cylindrical housing 46, by screws (not shown). The flexible conduit 14, as aforesaid, is received in the tube 13. The rearward end portion 71 of the wire 15 protrudes through the front end wall 52, and the terminal portion thereof is received in the actuator block 64, and is retained by a set screw 72, as best seen in FIGS. 3 through 10 wherein the thickness of the wire is exaggerated.

A slot 73 is formed through the wall of the tubular sleeve 1 and the annular wall 51, to afford the use of a handle 74. The handle is formed at its inner end with flanges 75 which project transversely to the handle, and which receive screws 76 whereby the handle is secured to the carrier. Thus as may seen from the various views, the handle may be pushed forwardly, toward the carburetor, to carry the actuator block slidingly forward on the rods 62 and 63. Such travel will force the wire 15 to slide through the flexible conduit 14. Because the forward end of the flexible conduit is secured at the bracket 21 by the clamping member 25, the flexible coil can neither move longitudinally or flex, with the result that the forward end portion of the wire 35 may slide in the slot 34, 34a, 34b to dispose the lock member 32 as desired. The wire 15 serves as a drive member to operate the lock member 32.

As best seen in FIGS. 3 through 10, the cylindrical housing 46 is provided with a pair of actuator restraints 81 which have sliding travel laterally of the actuator 64, on respective supports 82,83. The actuator is formed with a pair of oppositely disposed grooves, 84 to receive the inner end portions of the restraints. Pairs of pins 85 are received in respective center blocks 86, to carry springs 91, which springs normally urge the restraints 81 into the actuator engaging position. As is clear from FIG. 2, the center blocks 86 are disposed between the upper and the lower restraint supports 82,83. The restraints are socketed at 92 to slidably receive the inner end portions of the aforesaid pins 85 as the restraints move in sliding travel.

Figure 2:
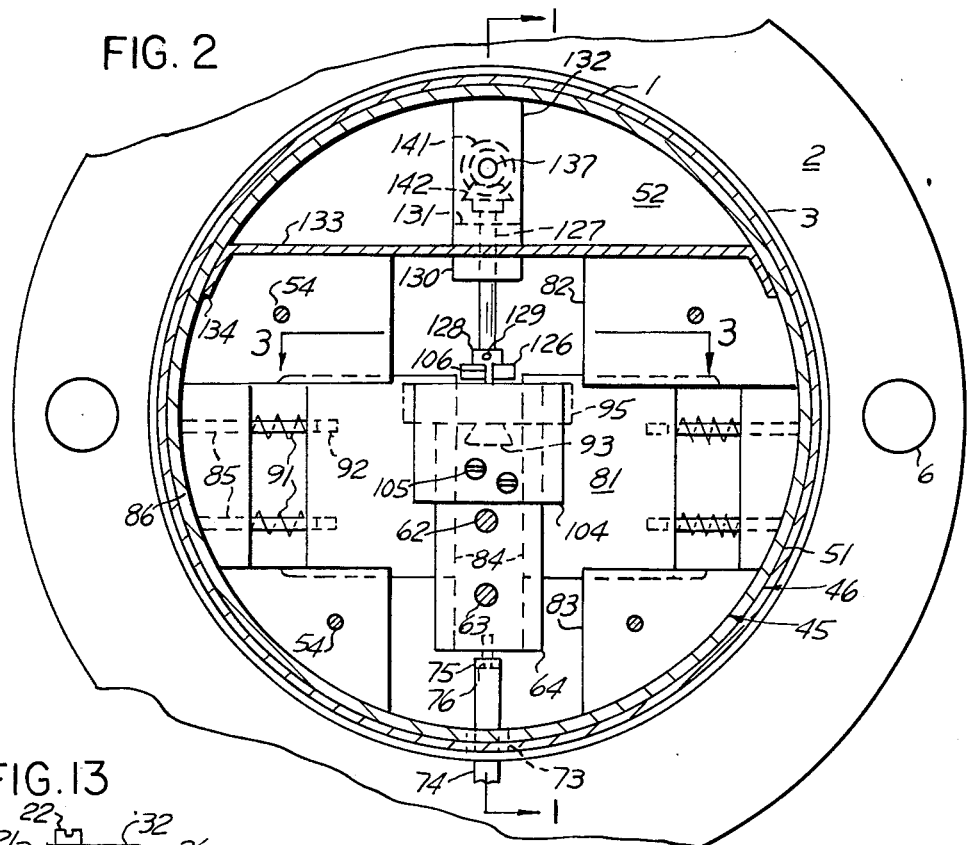
FIG. 2 is a sectional view taken on line 2—2 of FIG. 1.
Figure 13:
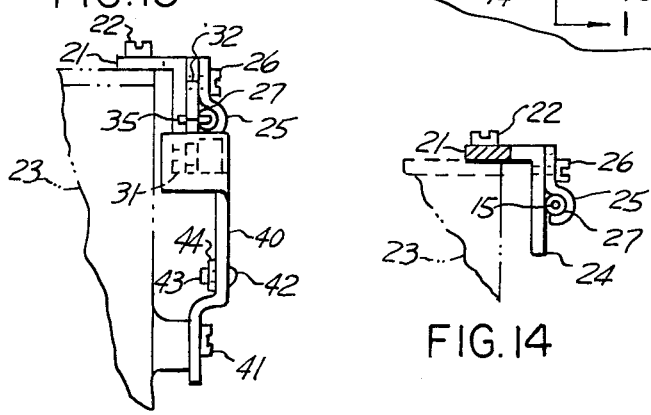
FIG. 13 is a vertical, partial, sectional view on line 13—13 of FIG. 11.
Figure 14:
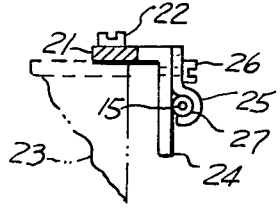
FIG. 14 is a partial, vertical, sectional view on line 14—14 of FIG. 11.

As may be seen in FIG. 2, the upper surface of the actuator is formed with a female dovetail 93, which slidably receives a male dovetail 94 formed on a trigger, which slidably surmounts the actuator. As is best seen in FIGS. 3, 5, 7, and 9 the trigger is formed at its rearward end portion with a head 101, which head is conjoined by an integral neck 102 to a latch section 103, formed with rearwardly diverging lateral faces. A trigger stop 104 is secured by screws 105 to the upper, rear end face of the actuator 64. A pin 106 projects upwardly from the trigger stop, and a corresponding pin 107 projects upwardly from the head 101 of the trigger. A spring 108 extends between said pins, and normally urges the trigger to the rearward limit of its sliding travel on the actuator 64.

Latch arms 111 are mounted upon a bracket 112, which bracket is secured to the interior face of the front wall 52 of the cylindrical housing 46 in any desired manner, as by screws (not shown). The end portions of the bracket 112 are formed with spaced apart flanges 113, which receive pivots 114. The pivoted, forward end portion of the latch arms are bent to wrap around the pivots 114. The rearward end portions of the latch arms are bent transversely to form teeth 115 which may be received in indents 116 on the latch section 103 of the trigger. Spring 117 normally urges the latch arms into their trigger engaging position. The latch arms are further formed with cam lugs 118, projecting inwardly toward each other, and each lug terminates in downwardly dependent cam stud 119. Each lug is also formed with a downwardly dependent flap, or flange 120, by which it may be secured to its respective latch arm, as by screws (not shown), or by brazing or welding.

Figure 4:
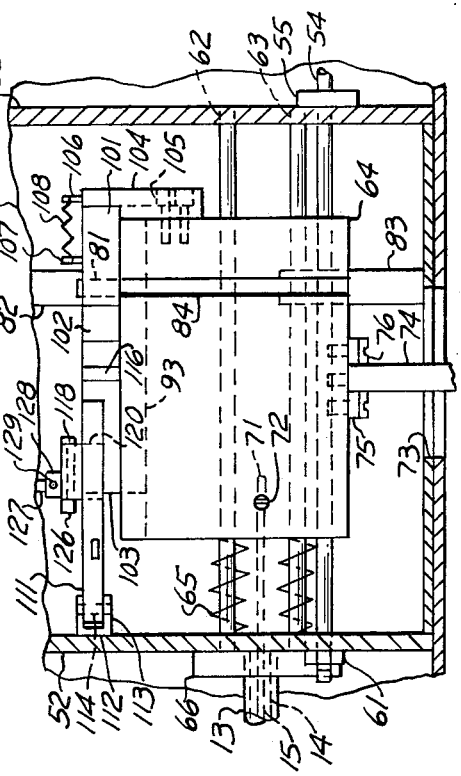
FIG. 4 is a partial, vertical, sectional view taken on line 4—4 of FIG. 3, and omitting a restraint member.

A cam element 126 is secured to the lower, terminal end portion of the vertical shaft 127, said cam element has a hub 128 which receives a set screw 129 to resist escape of the cam from the shaft 127. As shown in FIGS. 1, 2 and 4, there is provided a lower journal block 130, and an upper journal block 131, the upper journal block also has a vertical leg 132. Both journal blocks 130 and 131 are secured, as by screws (not shown) to a horizontal wall 133 disposed in the upper portion of the annular wall 51. The horizontal wall 133 laterally terminates in the arcuate flanges 134 by which it is secured to the cylindrical wall as by welding, or by screws (not shown). An upper portion of the vertical shaft 127 journals in the aforesaid journal blocks, and suitable bearings may be provided, if desired.

A horizontal shaft 137, as best seen in FIG. 1, has its forward end portion journalled in the vertical leg 132 of the journal block 131. The rearward end portion of the horizontal shaft is secured to a barrel lock 138, which is secured by screws 139 to the rear wall 53 of the cylindrical housing 46. It is proposed that the lock 138 will be of a usual, conventional type, receiving a key in a key slot (not shown) by which the barrel of the lock may be rotated, and without which key, barrel of the lock may not be rotated.

The horizontal shaft 137 forwardly, terminally mounts a bevel gear 141, the teeth of which mesh with a corresponding bevel gear 142 terminally carried by the upper end portion of the vertical shaft 132. Obviously, set screws, or the like may be employed to secure the bevel gears in position upon their respective shafts.

OPERATION

Figure 3:
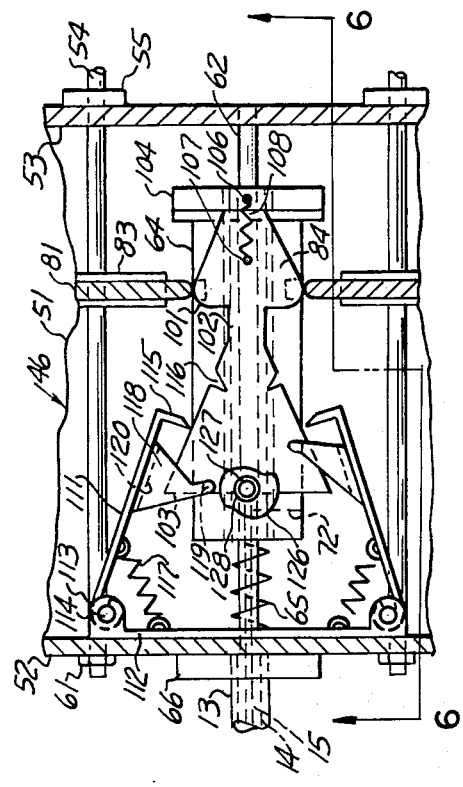
FIG. 3 is a partial, horizontal, sectional view of the locking assembly, taken on line 3—3 of FIG. 2, and showing the actuating member in the locking position, restrained by the restraint members, with the trigger in the retracted position and restrained by latch arms, in which position the lock member is in its locking position and the vehicle cannot be started.
Figure 7:
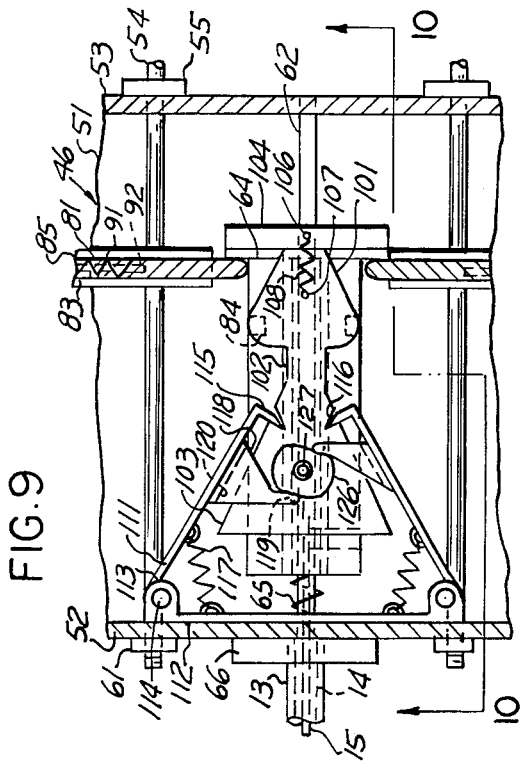
FIG. 7 is a view similar to FIGS. 3 and 5, but showing the trigger mechanism at the end of its spring-induced travel, and the actuator also at the end of its travel, which is also spring induced.
Figure 8:
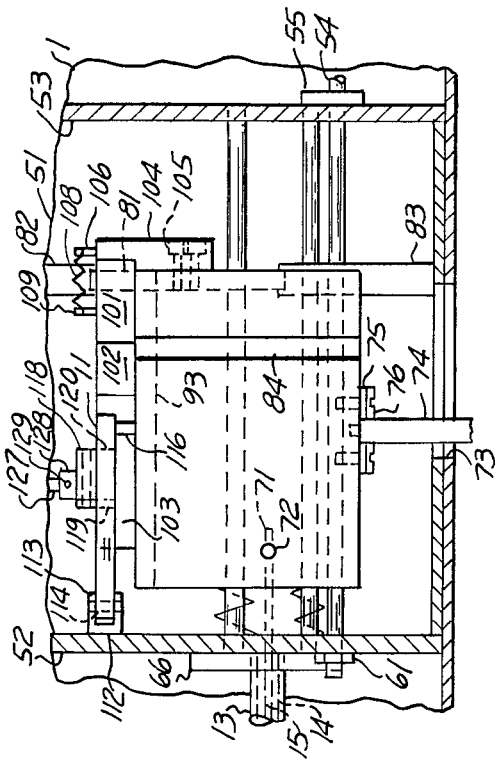
FIG. 8 is a partial, vertical, sectional view taken on line 8—8 of FIG. 7 and omitting a restraint.

FIGS. 3 and 4 show the actuator 64 in its locked, or restrained position, engaged by the restraints 81. The trigger has been earlier slid forwardly of the vehicle until the latch arms 111 were urged by their respective springs 117 to engage the teeth 115 in the indents 116 formed on the latch section 103 of the trigger. Consequently, the drive member wire 15, has been forced forwardly, and the end portion 35 thereof engaged in the slot 34, has disposed the lock lever in its lock position. It should be noted that the portion 34a of the the slot 34 is intended to allow sufficient forward movement of the actuator 64 to engage the latch arm 111 with the trigger latch section 103 without affecting the lock member, subsequent to which there will be some rearward sliding travel of the actuator to the position shown in FIG. 3, to dispose the end portion 35 of the wire 15 as shown in FIG. 1. The portion 34b of slot 34 allows travel of the end portion 35 of the wire 15 to allow the actuator to move to its rearmost position of sliding travel as shown in FIGS. 7 and 8, without affecting the position of the lock member. Obviously, the angle of the slot 34, and the lengths of those portions 34a and 34b may be varied to adapt the device for use in a great variety of vehicles.

Figure 5:
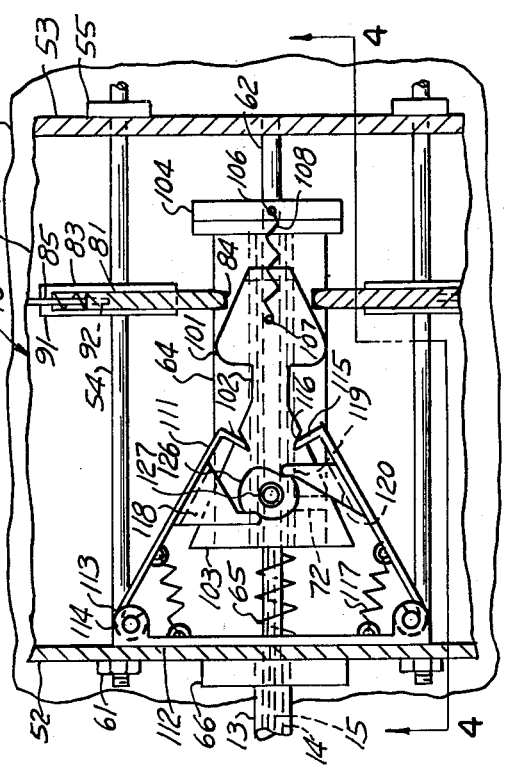
FIG. 5 is a view similar to FIG. 3, but illustrating the latch arms in their disengaged position, with the trigger in position to disengage the restraint members from the actuator.
Figure 6:
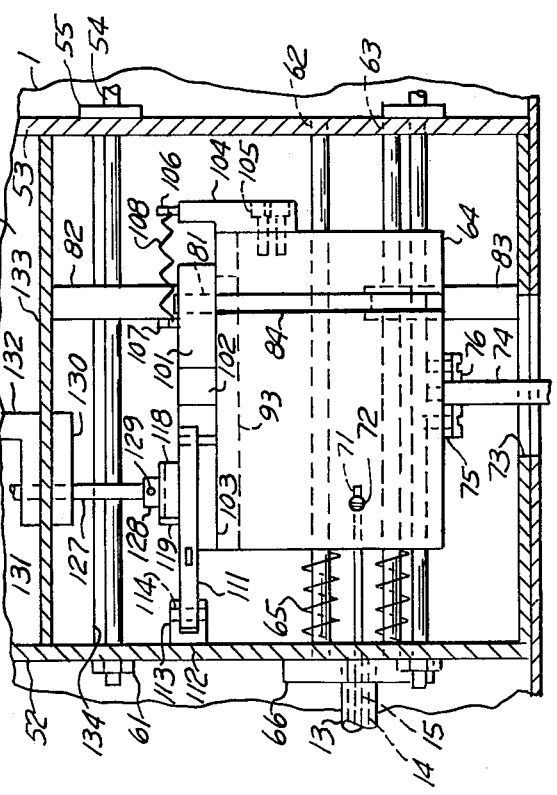
FIG. 6 is a partial, vertical, sectional view taken on line 6—6 of FIG. 5.

With the actuator, trigger, latch arms, and restraint members disposed as in FIGS. 3 and 4, a key may be inserted in the barrel of the lock 140 and rotated 180° to establish the cam member in the position shown in FIGS. 5 and 6. In these views the cam member 126 has acted upon the cam studs 119 to overcome the urgings of the springs 117 and disengage the teeth 115 from the indents 116. As shown in FIGS. 5 and 6, the trigger 101, 102, 103 has responded to the urging of the spring 108 to move forwardly so that the head 101 has disengaged the restraints 81 from the grooves 84. Further movement of the actuator will follow, responsive to the springs 65 to dispose the actuator at the rearward end of its sliding travel on ths slide rods 62 and 63. Responsive to the spring 108, the trigger will move rearwardly with the actuator. The actuator draws the wire 15 rearwardly with it, disposing the locking arm in the position shown in FIG. 12, and allowing free action to the carburetor throttle valve lever 40. In actuality, when the restraint has moved to position shown in FIG. 7, the end portion 35 of the wire 15 will have moved into section 34b of the slot 34.

Figure 9:
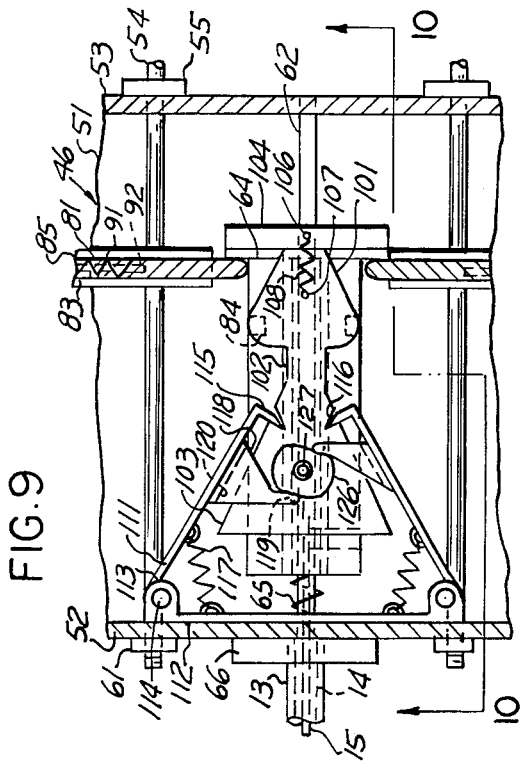
FIG. 9 is a view similar to FIGS. 3, 5, and 7, showing the actuator and trigger in a position preliminary to locking the device, with the trigger mechanism carried forwardly in sliding travel by the actuator to allow engagement of the latch arms, whereby the release of the handle will cause springs to urge the actuator in rearward sliding travel for engagement by the said restraint means.
Figure 10:
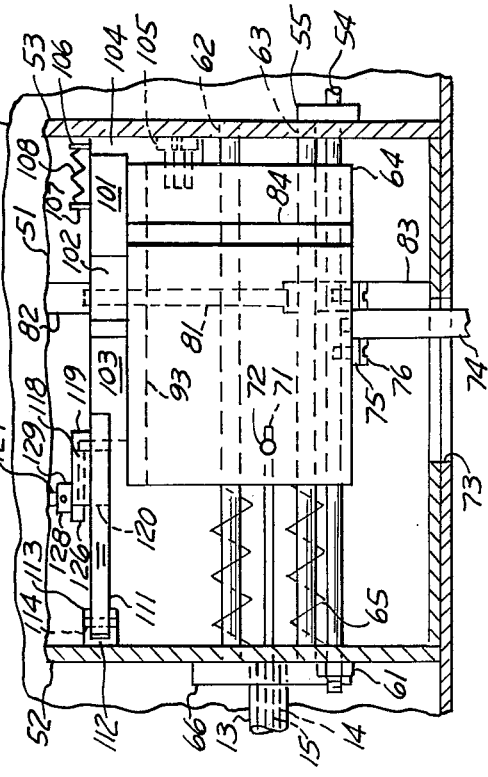
FIG. 10 is a partial, vertical, sectional view taken on line 10—10 of FIG. 9.

When it is desired to turn off the engine of the vehicle, and resist movement of the throttle valve lever 40, the operator of a vehicle need merely grasp the handle 74, and push it forwardly until, as shown in FIGS. 9 and 10, the spring loaded latch arms are drawn toward each other until the teeth 115 engage in the detents 116. Thereupon, the handle may be released and the carrier will slide forwardly until the restraint members 81 are forced by the springs 91 to slide inwardly and engage their end portions in the grooves 84 formed in the sides of the actuator 64.

Brackets (not shown) may have an end portion secured to the sleeve and will necessarily have to be adapted to help support the rear end of the tubular sleeve in various vehicles.

The studs 54 retain the relationship of the cylindrical housing 46 longitudinally of the sleeve 1, because the circular heads 56 are welded, or otherwise secured to the interior, or forward surface of the rear wall 60. The journal blocks 130, 131 can be retained in position by welding to the horizontal wall 133, or by screws (not shown) between the journal blocks, themselves, or between the block 130 and the horizontal wall, and between the vertical leg 132 and the annular wall 51 of the cylindrical housing 46.

What I claim is:

1. In combination, a throttle valve lock, a motor vehicle having an internal combustion engine, a carburetor mounted upon said engine, a passenger compartment, and a fire wall separating the passenger compartment from the engine, wherein the improvement comprises,
    a lock member, having reciprocable travel between a throttle valve lock position to resist functioning of said throttle valve, and a throttle valve release position to afford such functioning,
    means mounting said lock member relative to and exteriorly of said carburetor for such travel,
    an actuator, mounted in the passenger compartment of such vehicle for operation by a driver,
    drive means interconnecting said lock member and said actuator to transmit a reversible drive from said actuator to said lock member,
    actuator support means supporting said actuator for reversible travel to operate said drive means,
    at least one restraint element releasably engageable with said actuator to resist said reversible travel and immobilize said lock member in said lock position,
    a restraint support to support said restraint element for said releasable engagement,
    a first spring means urging said restraint element to engage said actuator,
    a trigger to disengage said restraint element from said actuator, and
    a second spring means urging said actuator to operate said drive means to establish said lock member in its throttle valve release position.

2. A locking device as set forth in claim 1,
    said trigger having a normal restraint element release position to disengage said restraint from said actuator, and having a non-release position,
    latch means releasably engageable with the trigger to hold said trigger in said non-release position, a third spring means normally urging said latch means to engage said trigger,
    latch release means to disengage said latches from said trigger, and
    a fourth spring means urging said trigger to its release position.

3. A device as set forth in claim 2, and further including,
    a mounting assembly for said actuator, said actuator support means being slide means carried by said mounting assembly, said actuator being mounted upon said slide means for reversible sliding travel thereon, whereby said actuator impels said drive means responsive to said sliding travel to dispose said lock member selectively in said lock position or said release position.

4. In the device as set forth in claim 3, said restraint means having travel transversely of said actuator, said actuator being adapted for releasable engagement by said restraint, said trigger surmounting said actuator and being adapted for sliding travel thereon, said actuator being adapted to receive said trigger in said sliding travel, said trigger being carried by said actuator in one direction to dispose said trigger for engagement by said latch means, and said latch means being secured to said mounting assembly to affect such releasable engagement, of said trigger.

5. In the device as set forth in claim 4, said second spring means urging said actuator in travel in the opposite direction for releasable engagement by said restraint element, whereby, upon disengagement of said latch means, said trigger is urged by said fourth spring means in travel to disengage said restraint element, and afford response by said actuator to said second spring means to impel said drive means to dispose said lock member in the throttle valve release position.

6. In the device as set forth in claim 5, said mounting assembly including, a continuous side wall, a front wall and a rear wall conjoined by and spaced apart by said continuous side wall, said actuator having sliding travel between said front wall and rear wall, said second spring means urging said actuator in travel toward said rear wall, a handle secured to said actuator to afford manually imposed travel of said actuator toward said front wall, said continuous side wall having a slot to allow said handle to project exteriorly of said side wall.

7. In a device as set forth in claim 6, stop means carried by said actuator to limit restraint release travel of said trigger, said fourth spring means reacting between said trigger and said stop means, said latch means being secured to said front wall to engage said trigger when manual operation carries said actuator and trigger toward said front wall.

8. In a device as set forth in claim 7, a tubular sleeve housing, enclosing said continuous side wall and said end wall, and means to mount said tubular sleeve housing in a vehicle.

* * * * *